US008806751B2

(12) United States Patent
Xie et al.

(10) Patent No.: US 8,806,751 B2
(45) Date of Patent: Aug. 19, 2014

(54) METHOD OF MANUFACTURING PRINTHEAD INCLUDING POLYMERIC FILTER

(75) Inventors: Yonglin Xie, Pittsford, NY (US); John A. Lebens, Rush, NY (US); Charles F. Faisst, Avon, NY (US)

(73) Assignee: Eastman Kodak Company, Rochester, NY (US)

( * ) Notice: Subject to any disclaimer, the term of this patent is extended or adjusted under 35 U.S.C. 154(b) by 448 days.

(21) Appl. No.: 12/767,828

(22) Filed: Apr. 27, 2010

(65) Prior Publication Data

US 2011/0258851 A1 Oct. 27, 2011

(51) Int. Cl.
*B21D 53/76* (2006.01)
*B23P 17/00* (2006.01)

(52) U.S. Cl.
USPC ................ 29/890.1; 347/20; 347/40; 347/44; 216/41; 216/52; 216/54

(58) Field of Classification Search
USPC ............ 29/890.1; 347/20, 40, 44; 216/41, 52, 216/54
See application file for complete search history.

(56) References Cited

U.S. PATENT DOCUMENTS

| | | | | |
|---|---|---|---|---|
| 4,068,241 | A | 1/1978 | Yamada | |
| 4,636,808 | A | 1/1987 | Herron | |
| 4,638,327 | A | 1/1987 | Sutera et al. | |
| 4,639,748 | A | 1/1987 | Drake et al. | |
| 4,774,530 | A * | 9/1988 | Hawkins | 347/63 |
| 5,124,717 | A | 6/1992 | Campanelli et al. | |
| 5,141,596 | A | 8/1992 | Hawkins et al. | |
| 5,204,690 | A | 4/1993 | Lorenze, Jr. et al. | |
| 5,489,930 | A | 2/1996 | Anderson | |
| 5,691,753 | A | 11/1997 | Hilton | |
| 6,079,821 | A | 6/2000 | Chwalek et al. | |
| 6,162,589 | A * | 12/2000 | Chen et al. | 430/320 |
| 6,234,623 | B1 | 5/2001 | Drake | |
| 6,264,309 | B1 | 7/2001 | Sullivan | |
| 6,267,251 | B1 | 7/2001 | Sullivan | |
| 6,280,643 | B1 | 8/2001 | Silverbrook | |
| 6,457,807 | B1 | 10/2002 | Hawkins et al. | |
| 6,491,362 | B1 | 12/2002 | Jeanmaire | |
| 6,505,921 | B2 | 1/2003 | Chwalek et al. | |
| 6,554,410 | B2 | 4/2003 | Jeanmaire et al. | |
| 6,575,566 | B1 | 6/2003 | Jeanmaire et al. | |
| 6,582,064 | B2 | 6/2003 | Cruz-Uribe et al. | |
| 6,583,350 | B1 | 6/2003 | Gee et al. | |
| 6,588,888 | B2 | 7/2003 | Jeanmaire et al. | |

(Continued)

FOREIGN PATENT DOCUMENTS

| | | |
|---|---|---|
| EP | 901 906 | 3/1999 |
| EP | 1 095 776 | 10/2006 |

*Primary Examiner* — Peter DungBa Vo
*Assistant Examiner* — Jeffrey T Carley
(74) *Attorney, Agent, or Firm* — William R. Zimmerli

(57) ABSTRACT

A method of manufacturing a printhead includes providing a substrate and a filter membrane structure. A first portion of the substrate defines a plurality of nozzles and a second portion of the substrate defines a plurality of liquid chambers. Each liquid chamber of the plurality of liquid chambers is in fluid communication with a respective one of the plurality of nozzles. The filter membrane structure is adhered, for example, laminated, to the second portion of the substrate. Each liquid chamber of the plurality of liquid chambers is in fluid communication with a distinct portion of the filter membrane structure. Pores are formed in the filter membrane structure using a photo-lithography process.

9 Claims, 6 Drawing Sheets

(56) References Cited

U.S. PATENT DOCUMENTS

| | | | | |
|---|---|---|---|---|
| 6,626,522 | B2 | 9/2003 | Rapp et al. | |
| 6,782,621 | B2 * | 8/2004 | Giere et al. | 29/890.1 |
| 6,793,328 | B2 | 9/2004 | Jeanmaire | |
| 6,827,429 | B2 | 12/2004 | Jeanmaire et al. | |
| 6,851,796 | B2 | 2/2005 | Jeanmaire et al. | |
| 6,905,619 | B2 | 6/2005 | Kawamura et al. | |
| 6,916,090 | B2 | 7/2005 | Valley et al. | |
| 6,923,530 | B2 | 8/2005 | Anderson et al. | |
| 6,943,037 | B2 | 9/2005 | Anagnostopoulos et al. | |
| 7,101,030 | B2 | 9/2006 | Clark et al. | |
| 7,607,766 | B2 | 10/2009 | Steiner | |
| 2004/0012662 | A1 | 1/2004 | Kneezel et al. | |
| 2004/0179073 | A1 | 9/2004 | Valley et al. | |
| 2005/0018022 | A1 | 1/2005 | Studer et al. | |
| 2005/0151798 | A1 | 7/2005 | Merz et al. | |

* cited by examiner

SECTION A-A

SECTION B-B

METHOD OF MANUFACTURING PRINTHEAD INCLUDING POLYMERIC FILTER

CROSS REFERENCE TO RELATED APPLICATIONS

Reference is made to commonly-assigned, U.S. patent applications Ser. No. 12/767,822, entitled "PRINTHEAD INCLUDING PARTICULATE TOLERANT FILTER", Ser. No. 12/767,824, entitled "PRINTHEAD INCLUDING FILTER ASSOCIATED WITH EACH NOZZLE", Ser. No. 12/767,827, entitled "PRINTHEAD INCLUDING POLYMERIC FILTER", Ser. No. 12/767,826, entitled "CONTINUOUS PRINTHEAD INCLUDING POLYMERIC FILTER", all filed concurrently herewith.

FIELD OF THE INVENTION

This invention relates generally to the field of digitally controlled printer systems and in particular to the filtering of liquids that are subsequently emitted by a printhead nozzle.

BACKGROUND OF THE INVENTION

The use of inkjet printers for printing information on recording media is well known. Printers employed for this purpose can include continuous printing systems which emit a continuous stream of drops from which specific drops are selected for printing in accordance with print data. Other printers can include drop-on-demand printing systems that selectively form and emit printing drops only when specifically required by print data information.

Continuous printer systems typically include a printhead that incorporates a liquid supply system and a nozzle plate having a plurality of nozzles fed by the liquid supply system. The liquid supply system provides the liquid to the nozzles with a pressure sufficient to jet an individual stream of the liquid from each of the nozzles. The fluid pressures and the flow rates from the liquid supply required to form the liquid jets in a continuous inkjet are typically much greater than the fluid pressures and the flow rates from the liquid supply employed in drop-on-demand printer systems.

Different methods known in the art have been used to produce various components within a printer system. Some techniques that have been employed to form micro-electro-mechanical systems (MEMS) have also been employed to form various printhead components. MEMS processes typically include modified semiconductor device fabrication technologies. Various MEMS processes typically combine photo-imaging techniques with etching techniques to form various features in a substrate. The photo-imaging techniques are employed to define regions of a substrate that are to be preferentially etched from other regions of the substrate that should not be etched. MEMS processes can be applied to single layer substrates or to substrates made up of multiple layers of materials having different material properties. MEMS processes have been employed to produce nozzle plates along with other printhead structures such as ink feed channels, ink reservoirs, electrical conductors, electrodes and various insulator and dielectric components.

Particulate contamination in a printing system can adversely affect quality and performance, especially in printing systems that include printheads with small diameter nozzles. Particulates present in the liquid can either cause a complete blockage or partial blockage in one or more nozzles. Some blockages reduce or even prevent liquid from being emitted from printhead nozzles while other blockages can cause a stream of liquid jetted from printhead nozzles to be randomly directed away from its desired trajectory. Regardless of the type of blockage, nozzle blockage is deleterious to high quality printing and can adversely affect printhead reliability. This becomes even more important when using a page wide printing system that accomplishes printing in a single pass. During a single pass printing operation, usually all of the printing nozzles of a printhead are operational in order to achieve a desired image quality and ink coverage on the receiving media. As the printing system has only one opportunity to print a given section of media, image artifacts can result when one or more nozzles are blocked or otherwise not working properly.

Conventional printheads have included one or more filters positioned at various locations in the fluid path to reduce problems associated with particulate contamination. Even so, there is an ongoing need to reduce particulate contamination in printheads and printing systems and an ongoing need for printhead filters that provide adequate filtration with acceptable levels of pressure loss across the filter. There is also an ongoing need for effective and practical methods for forming printhead filters using MEMS fabrication techniques.

SUMMARY OF THE INVENTION

According to an aspect of the present invention, a method of manufacturing a printhead includes providing a substrate and a filter membrane structure. A first portion of the substrate defines a plurality of nozzles and a second portion of the substrate defines a plurality of liquid chambers. Each liquid chamber of the plurality of liquid chambers is in fluid communication with a respective one of the plurality of nozzles. The filter membrane structure is adhered, for example, laminated, to the second portion of the substrate. Each liquid chamber of the plurality of liquid chambers is in fluid communication with a distinct portion of the filter membrane structure. Pores are formed in the filter membrane structure using a photo-lithography process.

BRIEF DESCRIPTION OF THE DRAWINGS

In the detailed description of the example embodiments of the invention presented below, reference is made to the accompanying drawings, in which.

DETAILED DESCRIPTION OF THE INVENTION

Figure 1:
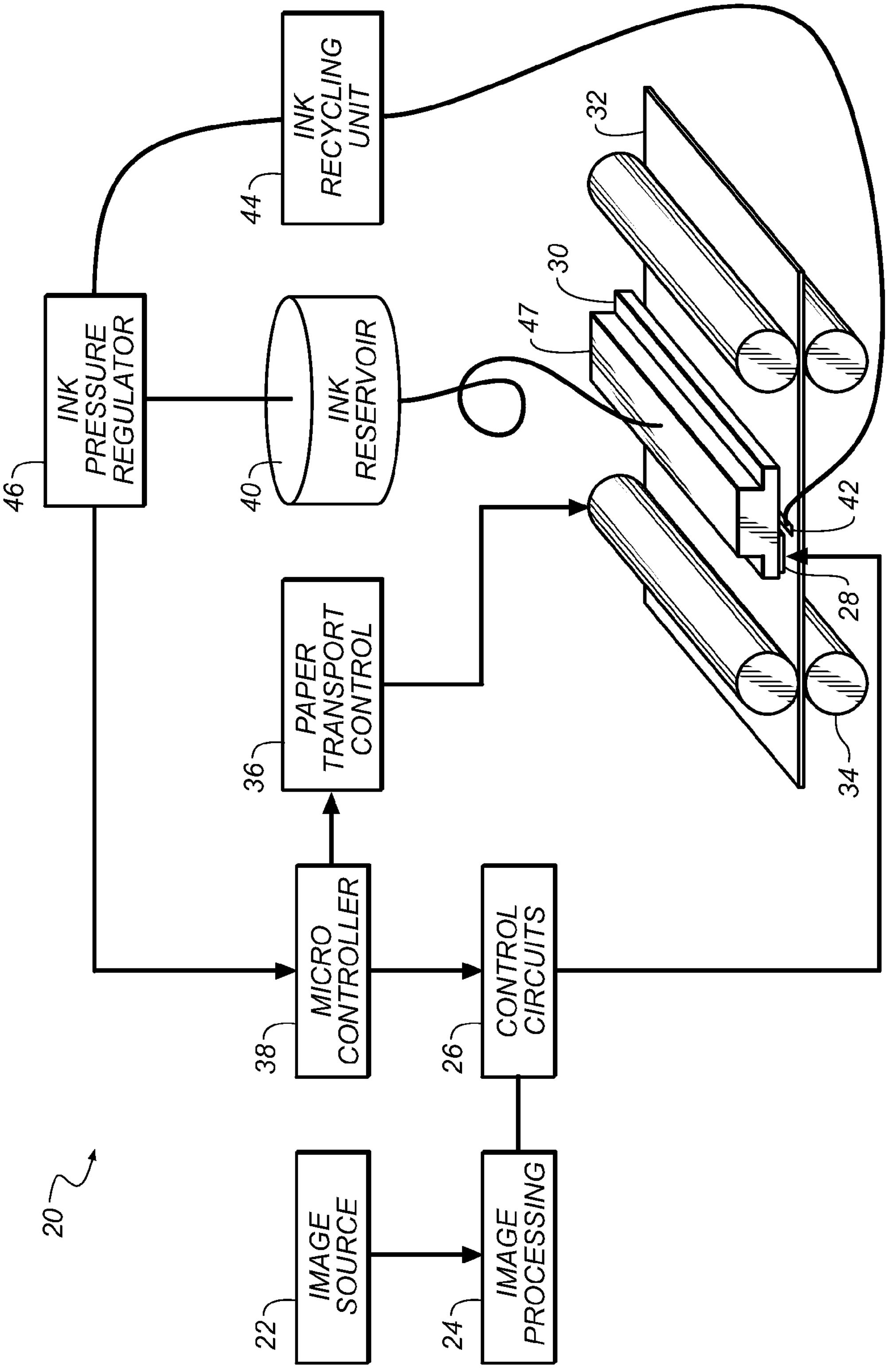
FIG. 1 shows a simplified schematic block diagram of an example embodiment of a printing system made in accordance with the present invention.

The present description will be directed in particular to elements forming part of, or cooperating more directly with, apparatus in accordance with the present invention. It is to be understood that elements not specifically shown or described may take various forms well known to those skilled in the art. In the following description and drawings, identical reference numerals have been used, where possible, to designate identical elements.

The example embodiments of the present invention are illustrated schematically and not to scale for the sake of clarity. One of the ordinary skills in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. As such, as described herein, the terms "liquid" and "ink" refer to any material that can be ejected by the printhead or printhead components described below.

Figure 2:
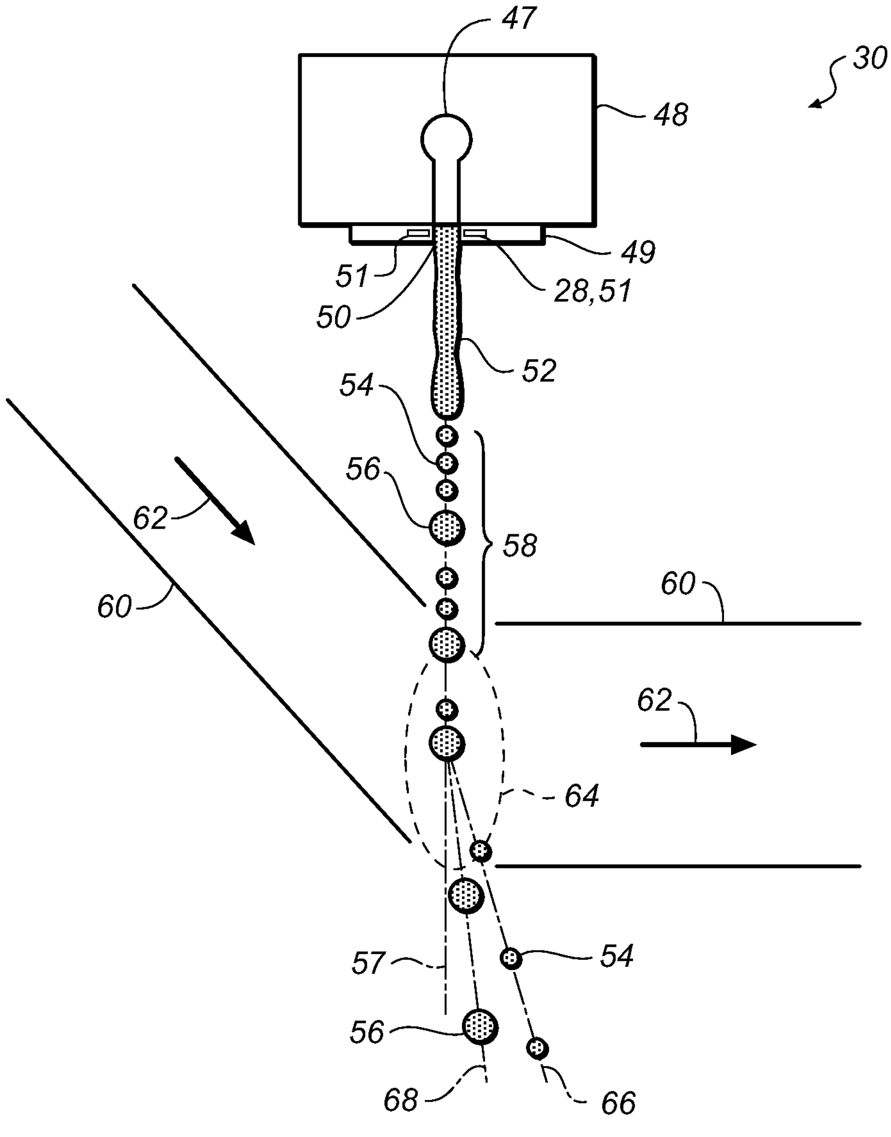
FIG. 2 is a schematic view of an example embodiment of a continuous printhead made in accordance with the present invention.
Figure 3:
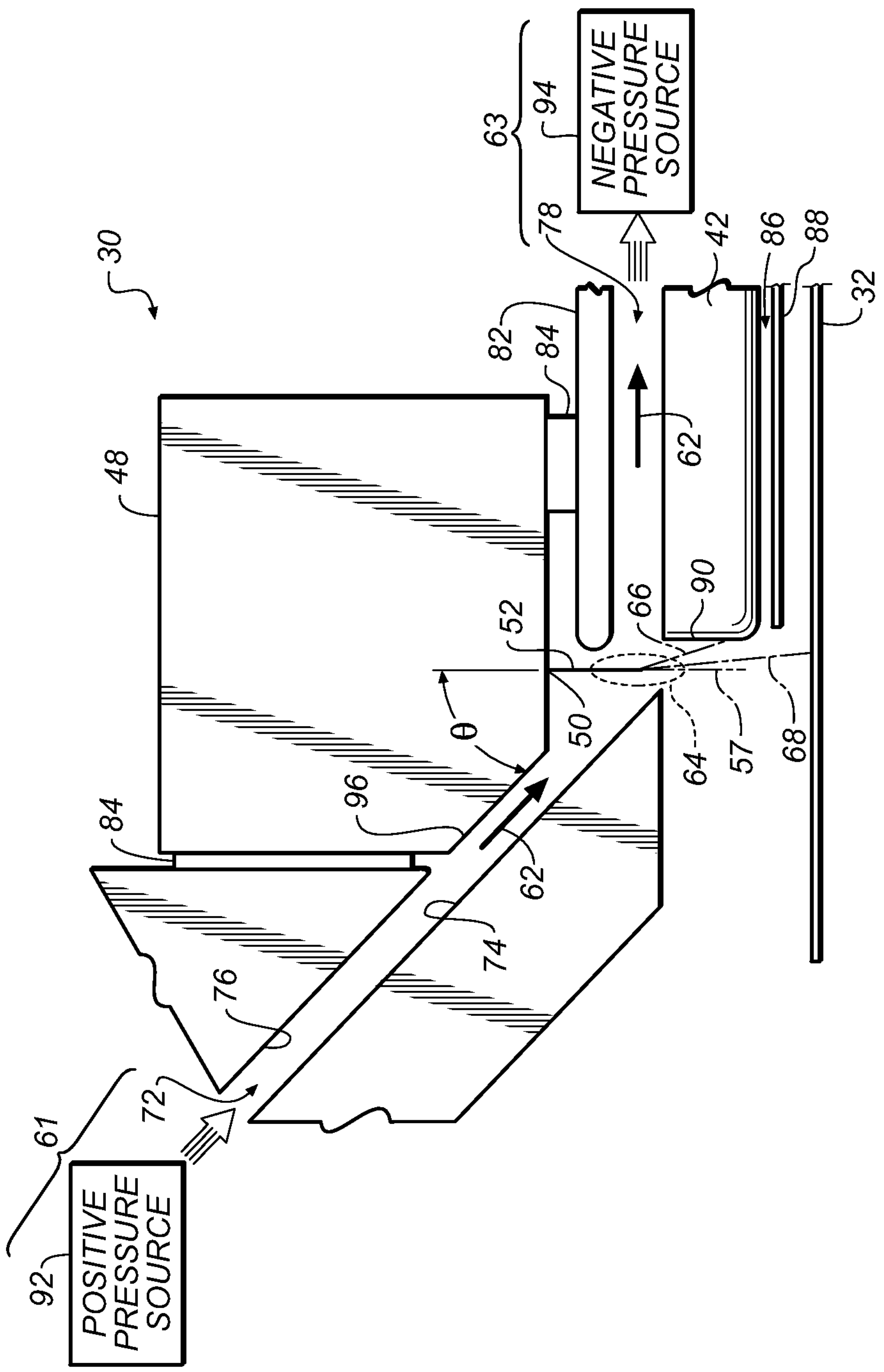
FIG. 3 is a schematic view of an example embodiment of a continuous printhead made in accordance with the present invention.

Referring to FIGS. 1-3, example embodiments of a printing system and a continuous printhead are shown that include the present invention described below. It is contemplated that the present invention also finds application in other types of printheads or jetting modules including, for example, drop on demand printheads and other types of continuous printheads.

Referring to FIG. 1, a continuous inkjet printing system 20 includes an image source 22 such as a scanner or computer which provides raster image data, outline image data in the form of a page description language, or other forms of digital image data. This image data is converted to half-toned bitmap image data by an image processing unit 24 which also stores the image data in memory. A plurality of drop forming mechanism control circuits 26 read data from the image memory and apply time-varying electrical pulses to a drop forming mechanism(s) 28 that are associated with one or more nozzles of a printhead 30. These pulses are applied at an appropriate time, and to the appropriate nozzle, so that drops formed from a continuous inkjet stream will form spots on a recording medium 32 in the appropriate position designated by the data in the image memory.

Recording medium 32 is moved relative to printhead 30 by a recording medium transport system 34, which is electronically controlled by a recording medium transport control system 36, and which in turn is controlled by a microcontroller 38. The recording medium transport system shown in FIG. 1 is a schematic only, and many different mechanical configurations are possible. For example, a transfer roller could be used as recording medium transport system 34 to facilitate transfer of the ink drops to recording medium 32. Such transfer roller technology is well known in the art. In the case of page width printheads, it is most convenient to move recording medium 32 past a stationary printhead. However, in the case of scanning print systems, it is usually most convenient to move the printhead along one axis (the sub-scanning direction) and the recording medium along an orthogonal axis (the main scanning direction) in a relative raster motion.

Ink is contained in an ink reservoir 40 under pressure. In the non-printing state, continuous inkjet drop streams are unable to reach recording medium 32 due to an ink catcher 42 that blocks the stream and which may allow a portion of the ink to be recycled by an ink recycling unit 44. The ink recycling unit reconditions the ink and feeds it back to reservoir 40. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 40 under the control of ink pressure regulator 46. Alternatively, the ink reservoir can be left unpressurized, or even under a reduced pressure (vacuum), and a pump is employed to deliver ink from the ink reservoir under pressure to the printhead 30. In such an embodiment, the ink pressure regulator 46 can comprise an ink pump control system. As shown in FIG. 1, catcher 42 is a type of catcher commonly referred to as a "knife edge" catcher.

The ink is distributed to printhead 30 through an ink channel 47. The ink preferably flows through slots or holes etched through a silicon substrate of printhead 30 to its front surface, where a plurality of nozzles and drop forming mechanisms, for example, heaters, are situated. When printhead 30 is fabricated from silicon, drop forming mechanism control circuits 26 can be integrated with the printhead. Printhead 30 also includes a deflection mechanism (not shown in FIG. 1) which is described in more detail below with reference to FIGS. 2 and 3.

Referring to FIG. 2, a schematic view of continuous liquid printhead 30 is shown. A jetting module 48 of printhead 30 includes an array or a plurality of nozzles 50 formed in a nozzle plate 49. In FIG. 2, nozzle plate 49 is affixed to jetting module 48. However, as shown in FIG. 3, nozzle plate 49 can be integrally formed with jetting module 48.

Liquid, for example, ink, is emitted under pressure through each nozzle 50 of the array to form streams, commonly referred to as jets, of liquid 52. In FIG. 2, the array or plurality of nozzles extends into and out of the figure.

Jetting module 48 is operable to form liquid drops having a first size or volume and liquid drops having a second size or volume through each nozzle. To accomplish this, jetting module 48 includes a drop stimulation or drop forming device 28, for example, a heater or a piezoelectric actuator, that, when selectively activated, perturbs each filament of liquid 52, for example, ink, to induce portions of each filament to breakoff from the filament and coalesce to form drops 54, 56.

In FIG. 2, drop forming device 28 is a heater 51, for example, an asymmetric heater or a ring heater (either segmented or not segmented), located in a nozzle plate 49 on one or both sides of nozzle 50. This type of drop formation is known with certain aspects having been described in, for example, one or more of U.S. Pat. No. 6,457,807 B1, issued to Hawkins et al., on Oct. 1, 2002; U.S. Pat. No. 6,491,362 B1, issued to Jeanmaire, on Dec. 10, 2002; U.S. Pat. No. 6,505,921 B2, issued to Chwalek et al., on Jan. 14, 2003; U.S. Pat. No. 6,554,410 B2, issued to Jeanmaire et al., on Apr. 29, 2003; U.S. Pat. No. 6,575,566 B1, issued to Jeanmaire et al., on Jun. 10, 2003; U.S. Pat. No. 6,588,888 B2, issued to Jeanmaire et al., on Jul. 8, 2003; U.S. Pat. No. 6,793,328 B2, issued to Jeanmaire, on Sep. 21, 2004; U.S. Pat. No. 6,827,429 B2, issued to Jeanmaire et al., on Dec. 7, 2004; and U.S. Pat. No. 6,851,796 B2, issued to Jeanmaire et al., on Feb. 8, 2005.

Typically, one drop forming device 28 is associated with each nozzle 50 of the nozzle array. However, a drop forming device 28 can be associated with groups of nozzles 50 or all of nozzles 50 of the nozzle array.

When printhead 30 is in operation, drops 54, 56 are typically created in a plurality of sizes or volumes, for example, in the form of large drops 56, a first size or volume, and small drops 54, a second size or volume. The ratio of the mass of the large drops 56 to the mass of the small drops 54 is typically approximately an integer between 2 and 10. A drop stream 58 including drops 54, 56 follows a drop path or trajectory 57.

Printhead 30 also includes a gas flow deflection mechanism 60 that directs a flow of gas 62, for example, air, past a portion of the drop trajectory 57. This portion of the drop trajectory is called the deflection zone 64. As the flow of gas 62 interacts with drops 54, 56 in deflection zone 64 it alters the drop trajectories. As the drop trajectories pass out of the deflection zone 64 they are traveling at an angle, called a deflection angle, relative to the undeflected drop trajectory 57.

Small drops 54 are more affected by the flow of gas than are large drops 56 so that the small drop trajectory 66 diverges from the large drop trajectory 68. That is, the deflection angle for small drops 54 is larger than for large drops 56. The flow of gas 62 provides sufficient drop deflection and therefore sufficient divergence of the small and large drop trajectories so that catcher 42 (shown in FIGS. 1 and 3) can be positioned to intercept one of the small drop trajectory 66 and the large drop trajectory 68 so that drops following the trajectory are collected by catcher 42 while drops following the other trajectory bypass the catcher and impinge a recording medium 32 (shown in FIGS. 1 and 3).

When catcher 42 is positioned to intercept large drop trajectory 68, small drops 54 are deflected sufficiently to avoid contact with catcher 42 and strike the print media. As the small drops are printed, this is called small drop print mode. When catcher 42 is positioned to intercept small drop trajectory 66, large drops 56 are the drops that print. This is referred to as large drop print mode.

Referring to FIG. 3, jetting module 48 includes an array or a plurality of nozzles 50. Liquid, for example, ink, supplied through channel 47 (shown in FIG. 2), is emitted under pressure through each nozzle 50 of the array to form streams or jets of liquid 52. In FIG. 3, the array or plurality of nozzles 50 extends into and out of the figure.

Drop stimulation or drop forming device 28 (shown in FIGS. 1 and 2) associated with jetting module 48 is selectively actuated to perturb the stream or jet of liquid 52 to induce portions of the stream to break off from the stream to form drops. In this way, drops are selectively created in the form of large drops and small drops that travel toward a recording medium 32.

Positive pressure gas flow structure 61 of gas flow deflection mechanism 60 is located on a first side of drop trajectory 57. Positive pressure gas flow structure 61 includes first gas flow duct 72 that includes a lower wall 74 and an upper wall 76. Gas flow duct 72 directs gas flow 62 supplied from a positive pressure source 92 at downward angle θ of approximately a 45° relative to liquid filament 52 toward drop deflection zone 64 (also shown in FIG. 2). An optional seal(s) 84 provides an air seal between jetting module 48 and upper wall 76 of gas flow duct 72.

Upper wall 76 of gas flow duct 72 does not need to extend to drop deflection zone 64 (as shown in FIG. 2). In FIG. 3, upper wall 76 ends at a wall 96 of jetting module 48. Wall 96 of jetting module 48 serves as a portion of upper wall 76 ending at drop deflection zone 64.

Negative pressure gas flow structure 63 of gas flow deflection mechanism 60 is located on a second side of drop trajectory 57. Negative pressure gas flow structure includes a second gas flow duct 78 located between catcher 42 and an upper wall 82 that exhausts gas flow from deflection zone 64. Second duct 78 is connected to a negative pressure source 94 that is used to help remove gas flowing through second duct 78. An optional seal(s) 84 provides an air seal between jetting module 48 and upper wall 82.

As shown in FIG. 3, gas flow deflection mechanism 60 includes positive pressure source 92 and negative pressure source 94. However, depending on the specific application contemplated, gas flow deflection mechanism 60 can include only one of positive pressure source 92 and negative pressure source 94.

Gas supplied by first gas flow duct 72 is directed into the drop deflection zone 64, where it causes large drops 56 to follow large drop trajectory 68 and small drops 54 to follow small drop trajectory 66. As shown in FIG. 3, small drop trajectory 66 is intercepted by a front face 90 of catcher 42. Small drops 54 contact face 90 and flow down face 90 and into a liquid return duct 86 located or formed between catcher 42 and a plate 88. Collected liquid is either recycled and returned to ink reservoir 40 (shown in FIG. 1) for reuse or discarded. Large drops 56 bypass catcher 42 and travel on to recording medium 32. Alternatively, catcher 42 can be positioned to intercept large drop trajectory 68. Large drops 56 contact catcher 42 and flow into a liquid return duct located or formed in catcher 42. Collected liquid is either recycled for reuse or discarded. Small drops 54 bypass catcher 42 and travel on to recording medium 32.

Alternatively, deflection can be accomplished by applying heat asymmetrically to stream of liquid 52 using an asymmetric heater 51. When used in this capacity, asymmetric heater 51 typically operates as the drop forming mechanism in addition to the deflection mechanism. This type of drop formation and deflection is known having been described in, for example, U.S. Pat. No. 6,079,821, issued to Chwalek et al., on Jun. 27, 2000.

Deflection can also be accomplished using an electrostatic deflection mechanism. Typically, the electrostatic deflection mechanism either incorporates drop charging and drop deflection in a single electrode, like the one described in U.S. Pat. No. 4,636,808, or includes separate drop charging and drop deflection electrodes.

As shown in FIG. 3, catcher 42 is a type of catcher commonly referred to as a "Coanda" catcher. However, the "knife edge" catcher shown in FIG. 1 and the "Coanda" catcher shown in FIG. 3 are interchangeable and work equally well. Alternatively, catcher 42 can be of any suitable design including, but not limited to, a porous face catcher, a delimited edge catcher, or combinations of any of those described above.

Figure 4A:
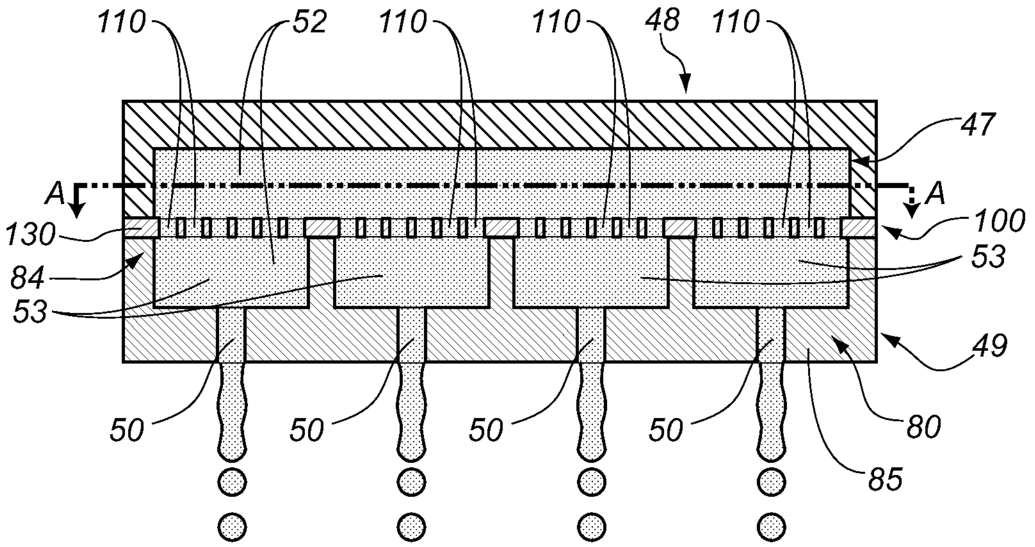
FIG. 4A is a schematic cross-sectional side view of a jetting module including an example embodiment of the invention.

FIG. 4A shows a cross-sectional view of jetting module 48 as employed in an example embodiment of the invention. Specifically, cross-sectional views of nozzle plate 49 and channel 47 are shown. For clarity, some structures, for example, device 28/heater 51, are not shown. In this example embodiment, channel 47 has been formed in a separate component which has been assembled into jetting module 48. Nozzle plate 49 includes first portions 80 defining the plurality of nozzles 50. For clarity, only four (4) nozzles 50 are shown. It is understood that other suitable numbers of nozzles 50 can be employed in other example embodiments. As shown in FIG. 4A, nozzle plate 49 includes second portions 84 defining a plurality of liquid chambers 53. The second portions 84 include a plurality of walled enclosures, each of liquid chambers 53 corresponding to one of the walled enclosures. Each walled enclosure includes a continuous wall surface as best shown in the cross-sectional plan view of FIG. 4B. In additional example embodiments, each walled enclosure can be formed from a plurality of adjoined walled structures. Each liquid chamber 53 is arranged to be in fluid communication with a respective one of nozzles 50. Alternatively stated, each liquid chamber 53 is in fluid communication with a single different one of the plurality of nozzles 50. Liquid 52 is provided by channel 47 to each of liquid chambers 53. The ports by which liquid 52 can be supplied to channel 47 and by which liquid 52 can be evacuated from channel 47 have been omitted from FIG. 4A for drawing clarity.

First portions 80 and the second portions 84 are formed in a substrate 85 using MEMS fabrication techniques. Silicon substrates are typically employed for this application because of their relatively low cost and their generally defect-free compositions. Nozzle plate 49 can include a single component substrate 85 or a multi-component substrate 85. Substrate 85 can include a single material layer or a plurality of material layers. In some example embodiments, nozzle plate 49 includes a substrate 85 which includes at least one material layer formed by a deposition process while in other example embodiments, nozzle plate 49 includes a substrate 85 that includes at least one material layer applied by a lamination process. In one example embodiment the nozzle plate includes drop forming devices 28 (shown in FIG. 2) associated with the nozzles. Exemplary steps for forming the nozzles 50 and associated drop forming devices 28 are described in U.S. Pat. No. 6,943,037, incorporated by reference herein.

In this example embodiment, nozzles 50 or liquid chambers 53 are formed in substrate 85 by an etching process. The etching process includes forming a patterned mask on a surface of substrate 85. The patterned mask can be formed in a photolithography process. The patterned mask is employed to substantially confine the dissolving action of an etchant to specific portions of substrate 85 which are to be removed to form desired features. The patterned mask is typically formed from a polymeric material layer positioned on a surface of substrate 85. In many applications, the patterned mask is typically formed from a type of photo-imageable polymeric material layer known as a photoresist. Suitable photoresists can include liquid photoresists and dry film photoresists. Uniform coatings of liquid photoresists can be applied to a surface of substrate 85 using coating methods including, for example, spin coating. Dry-film photoresists usually include an assemblage comprising a backing layer and a resist layer. The assemblage is laminated onto a surface of the substrate 85 and the backing layer is removed while leaving the resist layer in contact with substrate 85.

Regardless of the form that the polymeric material layer takes, it is patterned to define the regions of the substrate 85 that are to be preferentially etched and the other regions of substrate 85 that are not to be preferentially etched. In example embodiments of the present invention that employ photoresists, a photo-lithography process can be employed to define these regions. Accordingly, these regions can be defined by exposing the photoresist to radiation so as to pattern it. The photoresist can be patterned by radiation that is image-wise conditioned by an auxiliary mask. Alternatively, the photoresist can be patterned directly by one or more radiation beams that are selectively controlled to expose selective regions of the photoresist. The type of radiation that is employed is typically motivated by the composition of the photoresist and can include, for example, ultra-violet radiation.

Polymeric material layers employed by the present invention can include a photosensitive material layer that undergoes a physical change in one or more of its material properties when exposed to the radiation. For example, selective regions of an employed photoresist can be exposed to radiation to alter the solubility of these regions. Different degrees of solubility can be achieved when radiation exposure is used to cross-link regions of a photoresist. Cross-links are established to link polymer chains together in polymeric material layers employed by the present invention. In some cases, cross-links can be established by subjecting certain polymeric materials to heat, pressure or certain chemical reagents. In some example embodiments of the present invention, one or more polymeric material layers are cross linked by subjecting the layers to radiation.

When regions of varying solubility are imparted in a photoresist, these regions can be dissolved or removed in the presence of a suitable etchant adapted for dissolving these regions while other regions of the photoresist remain intact. For example, radiation exposed regions in a negative working photoresist remain substantially intact when exposed to a suitable etchant while non-radiation exposed regions are dissolved. The opposite occurs for positive working photoresists in which radiation exposed regions are dissolved when exposed to a suitable etchant, while non-radiation exposed regions remain substantially intact in the presence of the etchant. Other processing steps including heat treatment steps or baking steps can also be employed in the formation of a patterned mask on a surface of substrate 85. The etching of the polymeric material layer typically continues until a portion of the underlying substrate 85 is exposed to the etchant though the opening that is formed in the polymeric material layer.

Once a patterned mask has been formed, features such as nozzles 50 or liquid chambers 53 are formed by exposing portions of substrate 85 to a suitable etchant though opening in the patterned mask. Examples of etching processes suitable for etching features in substrate 85 include wet chemical etching processes, vapor etching processes, and inert plasma or chemically reactive plasma etching processes. In this example embodiment, each of the nozzles 50 and the liquid chambers 53 was produced using a dry etching process. Specifically, selective portions of substrate 85 were exposed to a reactive vapor etchant suitable for reacting and removing the portions to form a desired feature. Once the feature has been formed in substrate 85, the patterned mask is removed from substrate 85 in preparation for subsequent step in the manufacturing process.

Nozzles 50 and liquid chambers 53 can be formed in separate etching processes. Nozzles 50 and liquid chambers 53 can be formed by etching the same surface of substrate 85. Alternatively, different surfaces of substrate 85 can be etched. These different surfaces can include, for example, opposing surfaces of substrate 85.

Different layers of material can be deposited between etching steps. For example, first portions 80 can be deposited and a first etching process is employed to form nozzle channels 50. Following the first etching process, liquid chambers 53 can be etched into the second portions 84 of substrate 85 in a second etching process. Nozzle channels 50 and fluid chambers 53 can be formed by any suitable MEMS fabrication technique.

In this regard, the formation of features such as nozzles 50 and liquid chambers 53 includes exposing substrate 85 to each of plurality of different etchants. The plurality of etchants employed may be selected from sets of etchants or combination of etchants. The set of etchants can include etchants suitable for use in a MEMS fabrication process. For example, a first set of one or more etchants is provided, each etchant in the first set being adapted to preferentially etch a polymeric material layer without substantially etching substrate 85. The first set of etchants can include etchants suitable for etching a photo-imageable polymer. For example, liquid photoresists such as SU-8 developed by the International Business Machines Corporation can be etched by acetone or PM actetate. Dry film photoresists such a MX 50015 developed by the DuPont Corporation can be etched by Tetramethylammonium hydroxide (TMAH or TMAOH). A second set of one or more etchants is also provided, each etchant in the second set being adapted to preferentially etch a portion of substrate 85 without substantially etching a polymeric material layer. For example, the second set of etchants can include etchants suitable for etching silicon such as wet chemical etchants such as potassium hydroxide (KOH) and vapor etchants such as Xenon difluoride ($XeF_2$).

The formation of a feature such as a nozzle 50 requires that substrate 85 be exposed to at least one etchant selected from each of the first set of etchants and the second set of etchants. The formation of accurately sized and shaped features in substrate 85 is dependant on the selective etching characteristics of each of the etchant selected from the first set and the etchant selected from the second set.

Referring back to FIG. 4A, jetting module 48 includes a filter adapted for filtering particulate matter from liquid 52. The filter can include filter members can include single component filter members, multi-component filter members, single layer filter members and multi-layer filter members. In this example embodiment, jetting module 48 includes filter membrane structure 100. Filter membrane structure 100 is adapted for filtering portions of liquid 52 that are provided to liquid chambers 53. In some example embodiments, filter membrane structure 100 is arranged to allow filtered liquid 52 to be provided to any or all of the liquid chambers 53. Filter membrane structure 100 is arranged to allow specific portions of filtered liquid 52 to be provided to selective ones of the liquid chambers 53.

Figure 4B:
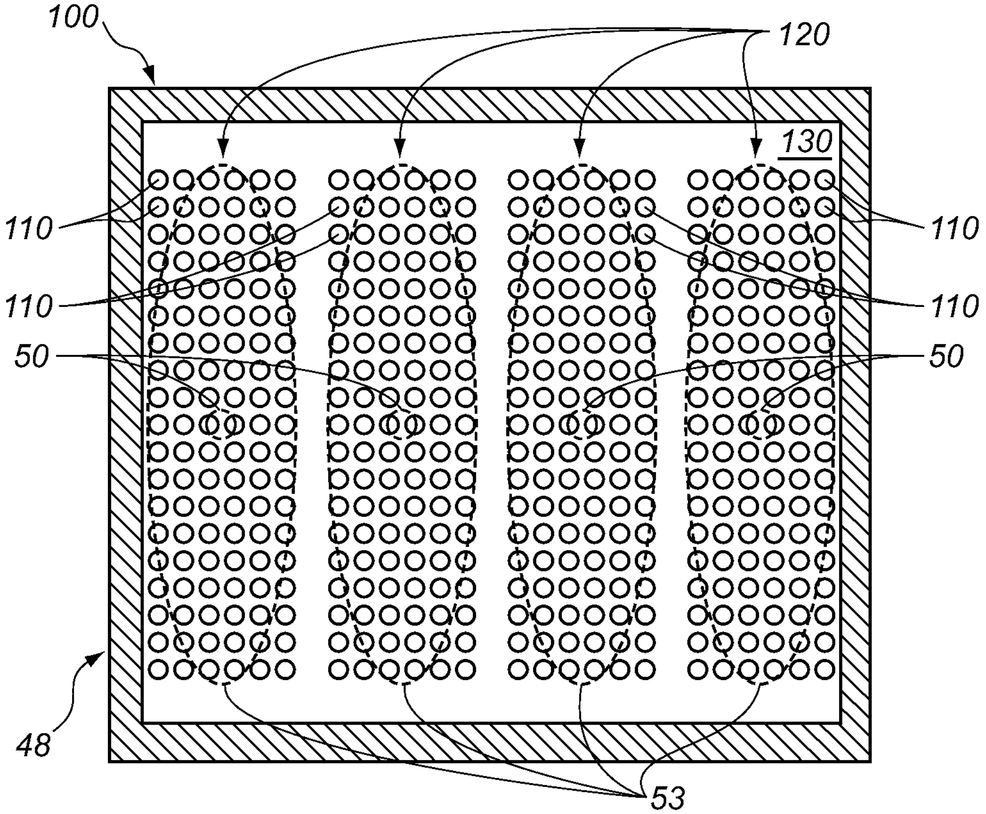
FIG. 4B is a schematic cross-sectional plan view of the jetting module of FIG. 4A.

Filter membrane structure 100 is positioned in contact with substrate 85. As shown in FIG. 4A, filter membrane structure 100 is positioned in contact with the second portions 84. FIG. 4B schematically shows a sectional plan view (i.e. SECTION A-A) of filter membrane structure 100 superimposed over fluid chambers 53 and nozzles 50 (i.e. both of which are shown in broken lines).

Filter membrane structure 100 includes a plurality of pores 110 adapted for filtering particulate matter from liquid 52. Pores 110 allow for fluid communication between channel 47 and liquid channels 53. Each of the pores 110 can include any sectional shapes suitable for filtering liquid 52 and are not limited to the round shape illustrated in FIG. 4B. The size of the pores 110 can vary in accordance with a measured or anticipated size of particulate manner within liquid 52. Circular shaped pores 110 can include diameters on the order of four (4) microns although other pore shapes, sizes, and pore arrangement patterns are permitted. In some example embodiments, pores 110 are sized such that an area of each pore 110 is less than half of the area of each nozzle 50. As shown in FIG. 4B, each of the plurality of pores 110 has a uniform size when compared to other pores of the plurality of pores 110.

All or a portion of the pores 110 can be arranged in random pattern. Alternatively, all or a portion of the pores 110 be arranged in a regular pattern. As shown in FIGS. 4A and 4B, pores 110 are grouped together in sets 120 with each set 120 corresponding to one of the fluid chambers 53.

As shown in FIG. 4A, filter membrane structure 100 is combined with nozzle plate 49 to form an integrated assembly. Filter membrane structure 100 is adhered to substrate 85 without an additional adhesive material. Filter membrane structure 100 is not separately formed and bonded to nozzle plate 49. Instead, filter membrane structure 100 is formed from one or more material layers deposited or positioned on substrate 85. Alternatively, filter membrane structure 100 can be separately formed and is positioned in contact with substrate 85.

MEMS fabrication techniques are preferentially employed to form integrated assemblages having combinations of conductive, semi-conductive, and insulator material layers, some or all of these layers having features formed therein by etching processes controlled by a patterned photoresist layer. As previously described, nozzles 50 and fluid chambers 53 can formed in substrate 85 using MEMS techniques. Using MEMS techniques to form filter membrane structure 100 on substrate 85 can lead to additional improvements in production throughputs and costs. Further, printhead reliability is improved as possible particulate contamination associated with the bonding of a separate filter to substrate 85 can be substantially reduced.

Conventional MEMS fabrication techniques can be employed to form filter membrane structure 100. For example, a portion of filter membrane structure 100 can be formed by similar methods employed to form nozzles 50 and fluid chambers 53. In this regard, a first material layer (e.g. silicon) is positioned onto substrate 85 and a photoresist layer is positioned atop the first material layer. The photoresist layer is exposed to a second radiation pattern representative of features in filter membrane structure 100. The second radiation pattern differs from a first radiation pattern employed in the formation of nozzles 50 or liquid chambers 53. A first etchant is used to etch the photoresist layer and a second etchant is used to etch the features of filter membrane structure 100 into the first material layer.

Referring back to FIGS. 4A and 4B, filter membrane structure 100 is not formed from a material such as silicon but rather, from a polymeric material layer. Filter membrane structure 100 includes a polymeric material layer 130 adapted for contact with liquid 52. Pores 110 are formed in polymeric material layer 130. Polymeric material layer 130 is a photoresist. In other example embodiments, polymeric material layer 130 can include a photo-imageable polymer material.

Advantageously, by forming a portion of filter membrane structure 100 directly from a photo-imageable polymer layer such as a photoresist, fewer production steps are necessary and the production related particulate contamination issues can be reduced. Accordingly, a portion of filter membrane structure 100 is formed by image-wise exposing polymeric material layer 130 to radiation. The radiation is used to selectively alter a solubility of regions of polymeric material layer 130, to selectively cross-link regions of polymeric material layer 130, or to define regions in polymeric material layer 130 that are cross-linked and adapted for contact with liquid 52. For example, after an etching process has been performed to form the plurality of pores 110, the remaining cross-linked regions can be used to form a suitable surface for filtering liquid 52. Radiation is used to define regions in polymeric material layer 130 corresponding to the plurality of pores 110. Pores 110 are arranged in a pattern, and the radiation includes a pattern of radiation corresponding to the pattern of pores 110. The pattern of radiation can be a negative image of the pattern of pores 110. Alternatively, the pattern of radiation can be a positive image of the pattern of pores 110.

Unlike the MEMS fabrication processes that were employed to form nozzles 50 in substrate 85 by exposing substrate to an first etchant adapted to preferentially etch a photo-imageable polymeric material without substantially etching a material of substrate 85 and a second etchant, that is different from the first etchant, adapted to preferentially etch a material of substrate 85 without substantially etching a photo-imageable polymeric material, filter membrane structure 100 is formed by exposing polymeric material layer 130 to a single etchant. In this example embodiment, polymeric material layer 130 is exposed to an etchant adapted to preferentially etch a photo-imageable polymeric material without substantially etching a material of substrate 85. Alternatively, polymeric material layer 130 can be exposed to the same etchant used to form a feature in substrate 85. The selected etchant is used to form the plurality of pores 110 in polymeric material layer 130. Unlike a typical MEMS fabrication process where a photo-imageable polymeric material layer is removed once it is employed as pattern mask to etch features in a functional element, the polymeric material layer 130 of the present invention is not removed, but rather, forms part of the desired functional element.

Polymeric material layer 130 can be positioned on substrate 85 using any suitable method. For example, polymeric material layer 130 can be deposited in liquid form on a surface of substrate 85 and subsequently cured to achieve a solid form. In the example embodiment described with reference to FIG. 4A, portions of polymeric material layer 130 overlaps or "bridges" the openings of liquid chambers 53. The bridging of these openings with polymeric material layer 130 can be accomplished in a variety of manners. For example, polymeric material layer 130 can be applied to a substantially planar surface of substrate 85 prior to the formation of features such as nozzles 50 or liquid channels 53. Alternatively, the openings can be filled with a sacrificial material which is planarized after application. Polymer material layer 130 in liquid form is then applied to the planarized surface. The sacrificial material can be subsequently removed in several ways, including, for example, via nozzles 50 or pores 110. In the present invention, filter membrane structures 100 have been formed from SU-8 photoresist applied in liquid form. SU-8 photoresist can be applied with a thickness as thin as 0.5 micrometers.

Polymeric material layer 130 can be laminated to substrate 85. In this example embodiment, polymeric material layer 130 is a dry film photoresist. The use of a dry film photoresist advantageously allows the openings defined by liquid channels 53 to be bridged without the use of sacrificial materials or restrictions on the formation sequence of features in substrate 85. Using this technique, filter membrane structures 100 have been formed from DuPont's MX 50015 dry film photoresist and the TMMF-2010 dry film photoresist manufactured by Tokyo Ohka Kogyo, Co. Ltd. of Japan, both with good results. The employed MX 50015 dry film photoresist comprised a thickness of approximately 15 micrometers while the TMMF-2010 dry film photoresist comprised a thickness of approximately 10 micrometers.

Depending on the specific application contemplated, some factors may need to be considered when employing a polymeric material layer as an integral component of membrane filter structure 100. For example, material compatibility with material components of substrate 85 as well as liquid 52 should be taken into account. Material properties such as the yield strength of the polymeric material may also be relevant as the amount of stress that polymeric material layer 130 should be able to withstand typically depends on the application contemplated.

In some applications, parameters of one or more material layers in jetting module 48 can be adjusted to take into account the typically reduced yield strength of polymeric material layer 130. Additional support members can be employed to reinforce filter membrane structure 100 if need be. FIG. 4A shows that the second portions 84 which define liquid chambers 53 also support portions of polymeric material layer 130. If polymeric material layer 130 has a size when viewed in a plane perpendicular to the direction of fluid flow through pores 110 that is incapable of withstanding a pressure exerted by liquid 52 without yielding, contact with second portions 84 or other structures may be employed to provide the necessary reinforcement.

Figure 5A:
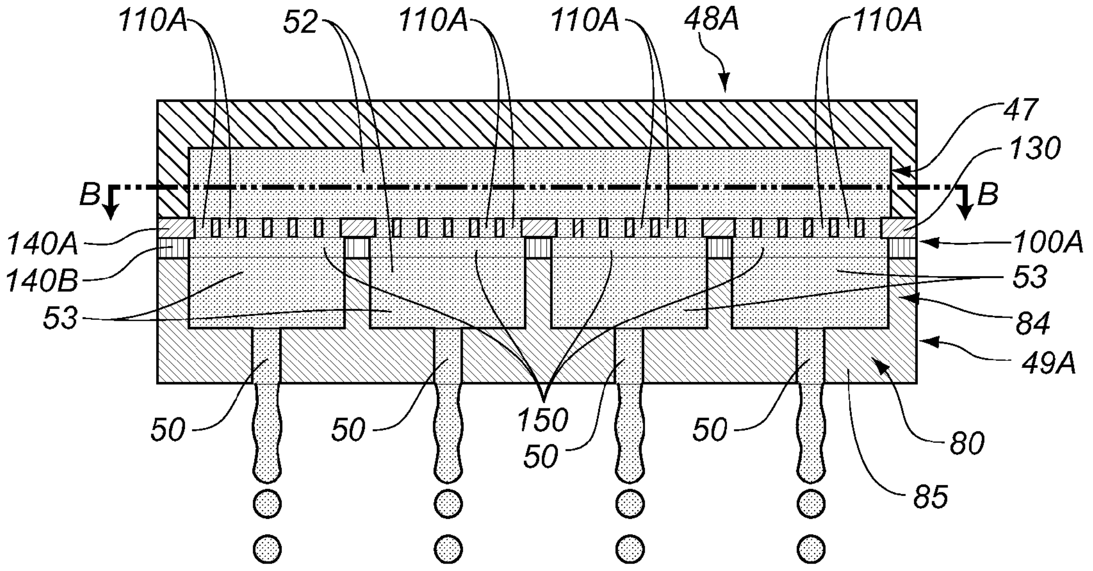
FIG. 5A is a schematic cross-sectional side view of a jetting module including another example embodiment of the invention.

FIG. 5A schematically shows a cross-sectional side view of a jetting module 48A formed in accordance with another example embodiment of the invention. Jetting module 48A includes substrate 85, nozzles 50 defined by first portions 80 of substrate 85, liquid channels 53 defined by second portions 84 of substrate 85 and channel 47, all which have a form and function similar to their counterparts illustrated in FIG. 4A. For convenience, identical identification numbers are used in the Figures to identify similar elements. Jetting module 48A includes a filter membrane structure 100A that includes a first material layer 140A and a second material layer 140B positioned between first material layer 140A and substrate 85. First material layer 140A includes a plurality of pores 110A adapted for filtering particulate contaminations (not shown) in liquid 52. The ports by which liquid 52 can be supplied to channel 47 and by which liquid 52 can be evacuated from channel 47 have been omitted from FIG. 5A for drawing clarity.

Referring to FIG. 5A, first material layer 140A is photo-imageable polymeric layer and can include a liquid or dry film photoresist. Pores 110A are formed in first material layer 140A by photo-lithography techniques similar to those described in previous example embodiments. Tapered pores 110A can be included in some example embodiments of the invention. This can be accomplished by defocusing the illumination source during the exposure process. Tapered pores 110A can help to lower the pressure drop across the filter membrane structure or use a thicker filter membrane (first material layer 140A). The taper can be oriented with the larger cross section being present on the upstream face or the downstream face of the first material layer 140A. Second material layer 140B includes a plurality of perimeter chambers 150 formed therein. Second material layer 140B is a photo-imageable polymeric layer and can include a liquid photoresist or a dry film photoresist.

Filter membrane structure 100A can be applied to the second portions 84 in using several techniques. For example, lamination techniques can be used. For example, first material layer 140A can be laminated to second material layer after second material layer 140B has been laminated to second portions 84. Alternatively, first material layer 140A can be laminated to second material layer 140B prior to the lamination of second material layer 140B to second portions 84.

First material layer 140A can be laminated to the second material layer without using an additional adhesive. When this is done, the plurality of perimeter channels 150 is typically formed after the second material layer 140B has been laminated to second portions 84 and prior to laminating first material layer 140 A to second material layer 140B. Second material layer 140B is laminated to second portions 84 and is appropriately patterned with radiation corresponding to the pattern of perimeter chambers 150. Second material layer 140 is then exposed to a suitable etchant to create perimeter chambers 150. After perimeter chambers 150 have been formed, first material layer 140A is laminated to second material layer 140B and pores 110A are formed in first material layer 140A by etching techniques similar to those previously disclosed.

Each perimeter chamber 150 is adapted to surround a portion of the plurality of pores 110A. Each of the perimeter chambers 150 is adapted to provide fluid communication between a portion of the pores 110A and a liquid channel 53. As best shown in the cross-sectional plan view (i.e. SEC- TION B-B) represented in FIG. 5B, each perimeter channel 150 (i.e. shown in broken lines) comprises a larger area than an associated liquid channel 53 (i.e. also shown in broken lines) when viewed in the direction of fluid flow through the perimeter channel 150. The addition of second material layer 140B and associated perimeter channels 150 can be employed to reduce flow impedance and increase filtration capacity. Each perimeter chamber 150 can be in fluid communication with a plurality of liquid chambers 53 or a plurality of nozzles 50.

Figure 5B:
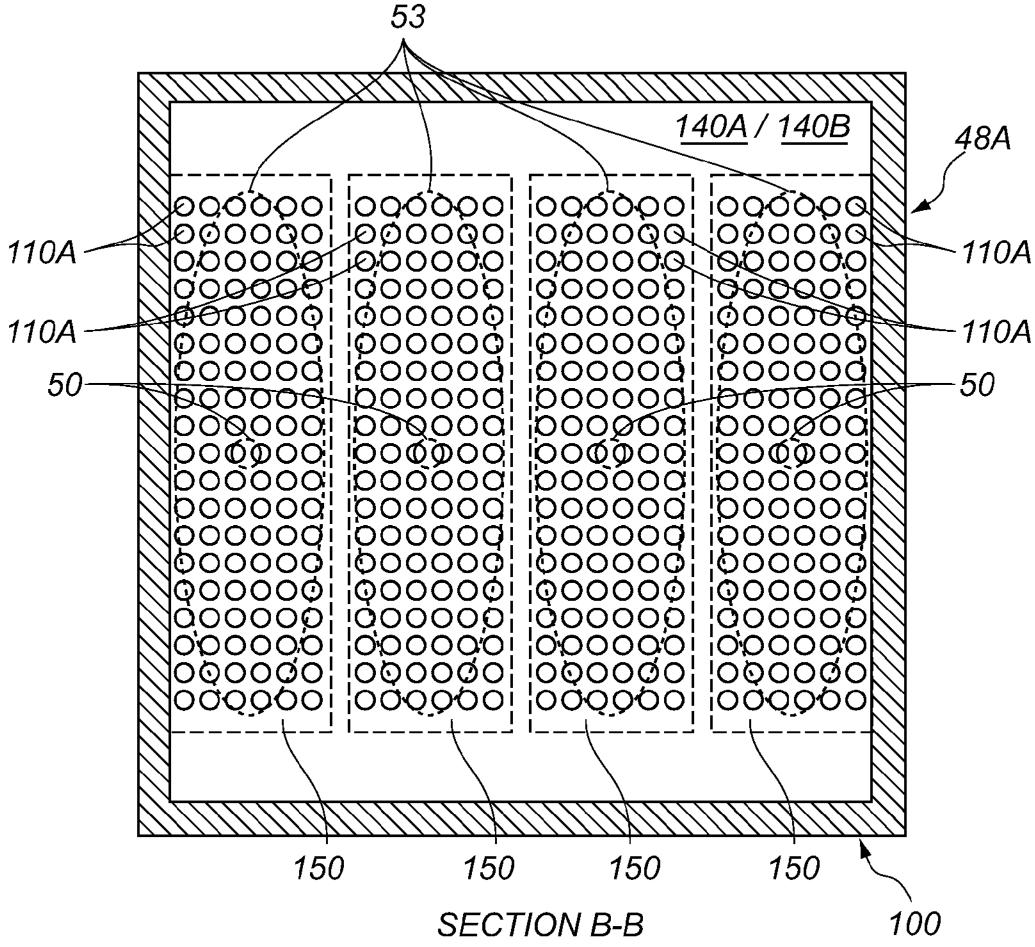
FIG. 5B is a schematic cross-sectional plan view of the jetting module of FIG. 5A.
Figure 6A:
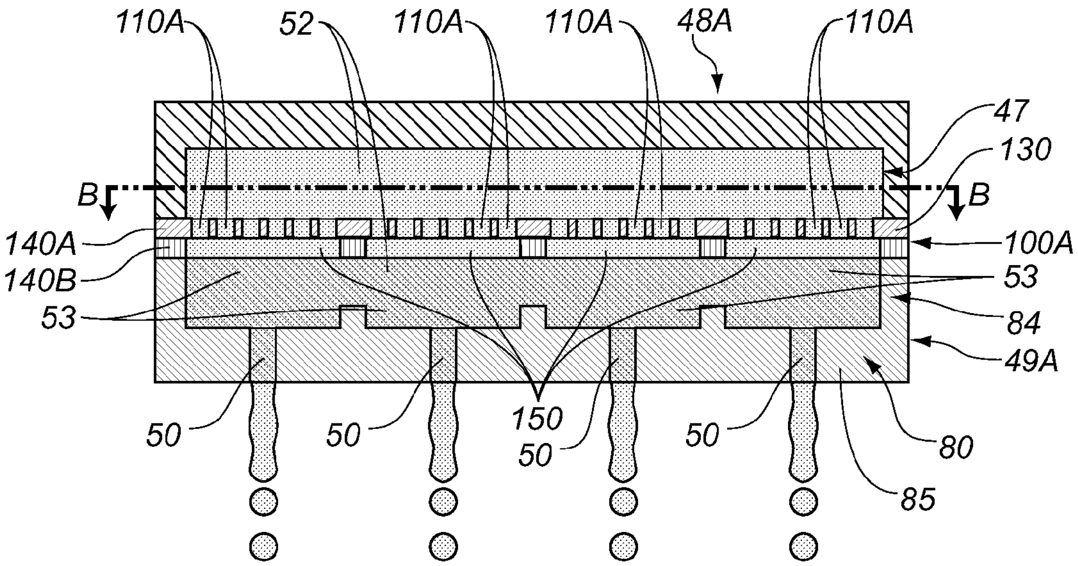
FIG. 6A is a schematic cross-sectional side view of a jetting module including another example embodiment of the invention.
Figure 6B:
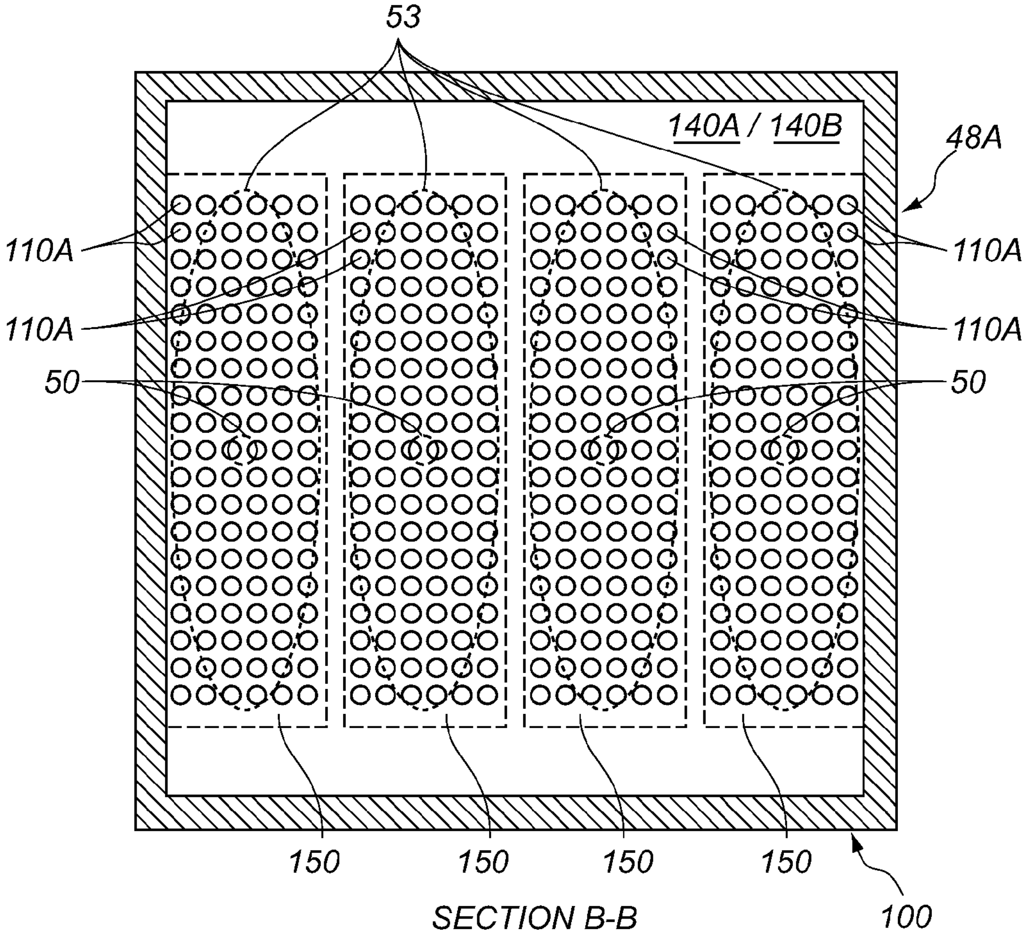
FIG. 6B is a schematic cross-sectional plan view of the jetting module of FIG. 6A.

Referring to FIGS. 6A and 6B, and back to FIGS. 5A and 5B, in some example embodiments of the invention, walls 55 of the liquid chambers 53 extend to meet and contact second material layer 140B (when present) or first material layer 140A. In other example embodiments, a gap 59 is present between one or more of walls 55 and second material layer 140B (when present) or first material layer 140A. When second material layer 140B is present and does not contact one or more of walls 55, second material layer provides structural reinforcement to first material layer 140A. As such, second material layer 140B is often referred to as ribs or a reinforcing structure. In this configuration, the pores 110A are in fluid communication with more than one liquid chamber 53 and are positioned to filter liquid provided to the plurality of liquid chambers 53. This filter membrane configuration helps to increase the number of pores available for filtering liquid.

The invention has been described in detail with particular reference to certain example embodiments thereof, but it will be understood that variations and modifications can be effected within the scope of the invention.

PARTS LIST

20 continuous inkjet printer system
22 image source
24 image processing unit
26 mechanism control circuits
28 device
30 printhead
32 recording medium
34 recording medium transport system
36 recording medium transport control system
38 microcontroller
40 reservoir
42 catcher
44 recycling unit
46 pressure regulator
47 channel
48 jetting module
48A jetting module
49 nozzle plate
50 plurality of nozzles
51 heater
52 liquid
53 liquid chambers
54 drops
55 wall
56 drops
57 trajectory
58 drop stream
59 gap
60 gas flow deflection mechanism
61 positive pressure gas flow structure
62 gas flow
63 negative pressure gas flow structure
64 deflection zone
66 small drop trajectory
68 large drop trajectory
72 first gas flow duct
74 lower wall
76 upper wall
78 second gas flow duct
80 first portions
82 upper wall
84 second portions
85 substrate
86 liquid return duct
88 plate
90 front face
92 positive pressure source
94 negative pressure source
96 wall
100 filter membrane structure
100A filter membrane structure
110 pores
110A pores
120 sets
130 polymeric material layer
140A first material layer
140B second material layer
150 perimeter chamber
200 conventional printhead
249 nozzle plate
250 nozzles
252 liquid
253 streams
260 liquid supply manifold
270 filter
A-A section
B-B section

The invention claimed is:

1. A method of manufacturing a printhead including a filter comprising:

providing a substrate, a first portion of the substrate defining a plurality of nozzles, a second portion of the substrate defining a plurality of liquid chambers, each liquid chamber of the plurality of liquid chambers being in fluid communication with a respective one of the plurality of nozzles;

providing a filter membrane structure, the filter membrane structure including a first material layer and a second material layer including a plurality of perimeter chambers, each of the perimeter chambers being in fluid communication with one of the liquid chambers;

laminating the filter membrane structure to the second portion of the substrate, each liquid chamber of the plurality of liquid chambers being in fluid communication with a distinct portion of the filter membrane structure; and forming pores in the filter membrane structure using a photo-lithography process, wherein laminating the filter membrane structure to the second portion of the substrate includes laminating the first material layer to the second material layer and laminating the second material layer to the second portion of the substrate, and forming the pores in the filter membrane structure using a photo-lithography process includes forming the pores in the first material layer, and wherein the plurality of perimeter chambers are formed after laminating the second material layer to the second portions and prior to laminating the first material layer to the second material layer.

2. The method of claim 1, wherein laminating the filter membrane structure to the second portion of the substrate includes adhering the filter membrane structure to the second portion of the substrate without using an additional adhesive.

3. The method of claim 1, the filter membrane structure including a single material layer, wherein laminating the filter membrane structure to the second portion of the substrate includes adhering the single material layer directly to the second portion of the substrate.

4. The method of claim 1, wherein laminating the filter membrane structure to the second portion of the substrate occurs before forming the pores in the filter membrane structure.

5. The method of claim 4, wherein laminating the filter membrane structure to the second portion of the substrate includes adhering the filter membrane structure to the second portion of the substrate without using an additional adhesive.

6. The method of claim 1, the filter membrane structure including a dry film photoresist.

7. The method of claim 1, wherein the first portion of the substrate includes a plurality of drop forming mechanisms.

8. The method of claim 1, wherein at least one of the plurality of nozzles and the plurality of liquid chambers is formed using an etching process.

9. The method of claim 1, wherein the pores formed in the polymeric material layer are grouped together in sets with each set corresponding to one of the plurality of liquid chambers.

* * * * *